(12) United States Patent
Goto

(10) Patent No.: US 9,094,635 B2
(45) Date of Patent: Jul. 28, 2015

(54) RECEPTION DEVICE, RECEPTION METHOD, PROGRAM, AND RECEPTION SYSTEM

(75) Inventor: Yuken Goto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/005,596

(22) PCT Filed: Apr. 11, 2012

(86) PCT No.: PCT/JP2012/059842
§ 371 (c)(1),
(2), (4) Date: Sep. 17, 2013

(87) PCT Pub. No.: WO2012/144382
PCT Pub. Date: Oct. 26, 2012

(65) Prior Publication Data
US 2014/0009685 A1    Jan. 9, 2014

(30) Foreign Application Priority Data
Apr. 22, 2011   (JP) ................................ 2011-095688

(51) Int. Cl.
*H03K 9/00* (2006.01)
*H04N 5/44* (2011.01)
(Continued)

(52) U.S. Cl.
CPC ............. *H04N 5/4401* (2013.01); *H04H 60/41* (2013.01); *H04L 27/2659* (2013.01); *H04L 5/0048* (2013.01); *H04L 27/2675* (2013.01)

(58) Field of Classification Search
CPC ... H04L 27/2659; H04N 5/4401; H04H 60/41
USPC ............... 375/316, 346; 329/318, 278.1, 295; 455/63.1
See application file for complete search history.

(56) References Cited

U.S. PATENT DOCUMENTS 5,852,630 A * 12/1998 Langberg et al. ............. 375/219
5,970,397 A * 10/1999 Klank et al. .................. 455/139
8,503,955 B2 * 8/2013 Kang et al. ................ 455/161.1

FOREIGN PATENT DOCUMENTS

GB           2449470 A   * 11/2008
JP      2007-318638 A     12/2007
WO    WO-2011/001632 A1    1/2011

OTHER PUBLICATIONS

DVB-2 Specification [Digital Video Broadcasting (DVB); Frame structure channel coding and modulation for a second generation digital transmission system for cable systems (DVB-C2)] DVB Document A 138.

(Continued)

*Primary Examiner* — Shuwang Liu
*Assistant Examiner* — Helene Tayong
(74) *Attorney, Agent, or Firm* — Sony Corporation

(57) ABSTRACT

The present technology relates to a reception device, a reception method, a program, and a reception system that make it possible for the location of a frequency band that is used for the transmission of a signal of a predetermined standard to be promptly detected. A reception device according to one aspect of the present technology is including: a reception unit that receives an OFDM signal of a predetermined frequency band; a calculation unit that obtains correlation values between signals transmitted using carriers used for the transmission of a known signal, from within the predetermined frequency band; and a detection unit that, on the basis of the correlation values, detects a frequency band used for the transmission of a signal of a predetermined standard and in which transmission of the known signal is continuously carried out in the same carrier.

9 Claims, 15 Drawing Sheets

(51) Int. Cl.
  *H04L 27/26* (2006.01)
  *H04H 60/41* (2008.01)
  *H04L 5/00* (2006.01)

(56) References Cited

OTHER PUBLICATIONS

DVB-C2 Implementation guidelines for a second generation digital cable transmission system (DVB-C2) ETSI TS 102 991 V1.2.1.

International Search Report; International Application No. PCT/JP2012/059842; Filed: Apr. 11, 2012; Mailing Date of the International Search Report: Jun. 12, 2012 (Form PCT/ISA/210).

Written Opinion of the International Searching Authority; International Application No. PCT/JP2012/059842; International Filing Date: Apr. 11, 2012; Dated: Jun. 12, 2012. (Form PCT/ISA/220 and PCT/ISA/237).

* cited by examiner

RECEPTION DEVICE, RECEPTION METHOD, PROGRAM, AND RECEPTION SYSTEM

TECHNICAL FIELD

The present technology relates to a reception device, a reception method, a program, and a reception system that, in particular, make it is possible to promptly detect the location of a frequency band used for the transmission of a signal of a predetermined standard.

BACKGROUND ART

DVB-C2 (Digital Video Broadcasting for Cable 2) serves as a European second-generation cable digital broadcasting standard (Non-Patent Document 1).

FIG. 1 is a drawing depicting an example of a C2 system. The horizontal axis of FIG. 1 represents frequency. One DVB-C2 signal is referred to as a C2 system, and includes a preamble symbol and a data symbol. In accordance with the standard, one C2 system constitutes a signal having a maximum bandwidth of approximately 3.5 GHz.

A preamble symbol is a symbol used for the transmission of L1 information (L1 signalling part 2 data), which is transmission control information. A preamble symbol is used for the same information to be repeatedly transmitted in a 3408 carrier period (OFDM (orthogonal frequency division multiplex) 3408 sub-carrier period).

A data symbol is a symbol used for the transmission of a TS (transport stream) or the like for program data and so on. A data symbol is divided into blocks referred to as data slices. For example, respectively different program data is transmitted in data slice 1 (DS1) and data slice 2 (DS2). Parameters relating to the data slices such as the number of data slices are included in the L1 information.

As depicted by the black filled-in parts in FIG. 1, it is possible for a notch to be included in a C2 system. A notch is a frequency band used for FM broadcasts, police wireless broadcasts, and military wireless broadcasts or the like, and is not used for the transmission of a C2 system. A notch section within a transmission signal output by a transmission device constitutes a non-signal section. With regard to notches, there are narrowband notches that have a bandwidth of 47 carriers or less, and broadband notches that exceed 47 carriers. Parameters relating to notches such as the number and bandwidths of notches are also included in the L1 information.

In this way, in DVB-C2, it is not necessary to provide guard bands between channels and, furthermore, because relatively narrow bands interposed between notches can also be used for the transmission of data, it is possible for frequency bands to be effectively used. Furthermore, it is possible for the allocation of frequency bands for broadcast signals to be carried out in a flexible manner.

However, with the flexible allocation of frequency bands being possible, from the point of view of a reception device, during a channel scan, it is difficult to detect the frequency band used for the transmission of a DVB-C2 OFDM signal.

In other words, in the case where frequency bands are allocated in a fixed manner by a country or a broadcasting organization as depicted in A of FIG. 2, a reception device can detect the frequency bands of broadcast signals if the presence/absence of broadcast signals is determined in accordance with the allocation of known frequency bands.

However, in the case of DVB-C2, sometimes a DVB-C2 OFDM signal constituting a desired signal deviates from the reception signal band when signals of predetermined frequency bands are received as depicted in B of FIG. 2. The reception of a DVB-C2 OFDM signal is, as depicted in B of FIG. 2, carried out in such a way that a signal within a tuning window of a bandwidth of 7.61 MHz is received.

FIG. 3 is a drawing illustrating a system for detecting the frequency band of a DVB-C2 OFDM signal.

As depicted in FIG. 3, an FFT calculation is carried out with respect to a time-domain signal acquired by carrying out orthogonal demodulation or the like on a DVB-C2 OFDM signal, and the absolute value (power (Abs(x) in FIG. 3)) for amplitude is obtained on the basis of a frequency-domain signal obtained by the FFT calculation. Furthermore, an average value for power is obtained by means of filter processing using an averaging filter, and the average value for power is compared with a threshold value c. For example, a section in which the average value for power is lower than the threshold value c is, as depicted in the left side of FIG. 4, detected as a guard band (gap) that is ensured between the frequency band for a signal of a certain standard and the frequency band for a signal of another standard.

A reception device, as indicated by the white arrow in FIG. 4, aligns the ends of a tuning window with guard bands and receives a signal, and carries out detection of the frequency band for a DVB-C2 OFDM signal. In this system, with the assumption that a guard band constituting a non-signal buffer section for preventing interference is provided between each signal, the power of the frequency bands is observed, and both ends of the frequency band of each signal are detected.

CITATION LIST

Non-Patent Document

Non-Patent Document 1: DVB-C2 Specification [Digital Video Broadcasting (DVB); Frame structure channel coding and modulation for a second generation digital transmission system for cable systems (DVB-C2)] DVB Document A138

Non-Patent Document 2: DVB-C2 Implementation Guidelines [Digital Video Broadcasting (DVB); Implementation guidelines for a second generation digital cable transmission system (DVB-C2)] ETSI TS 102 991 V1.1.2

SUMMARY OF THE INVENTION

Problems to be Solved by the Invention

According to the conventional system described with reference to FIG. 3, although the actual presence of a signal can be detected, it is not possible to determine whether a detected signal is a DVB-C2 OFDM signal or a signal of another standard.

In order to determine whether a detected signal is a DVB-C2 OFDM signal or a signal of another standard, it is necessary for a transmission device to actually carry out the reception operation stipulated by DVB-C2 after detection of the presence of the signal. The transmission device determines that the detected signal is a DVB-C2 OFDM signal if the transmission device has been able to receive a DVB-C2 OFDM signal by actually carrying out the reception operation, and determines that the detected signal is a signal of another standard if the transmission device is not able to receive a DVB-C2 OFDM signal.

In the case where the reception operation stipulated by DVB-C2 is to be actually carried out each time the presence of a signal is detected, it would take time to detect the frequency band of a DVB-C2 OFDM signal.

The present technology takes this kind of situation into consideration, and makes it possible to promptly detect the location of a frequency band that is used for the transmission of a signal of a predetermined standard such as DVB-C2.

Solutions to Problems

A reception device according to an aspect of the present technology includes: a reception unit that receives an OFDM signal of a predetermined frequency band; a calculation unit that obtains correlation values between signals transmitted using a carrier used for the transmission of a known signal, from within the predetermined frequency band; and a detection unit that, on the basis of the correlation values, detects a frequency band used for the transmission of a signal of a predetermined standard and in which transmission of the known signal is continuously carried out in the same carrier.

The reception device may be one IC chip, or may be a component including an IC chip or a device configured from a component including an IC chip.

The calculation unit, for each carrier, may obtain a cumulative value of the correlation values between signals transmitted using the same carrier, and the detection unit may detect, as the frequency band used for the transmission of the signal of the predetermined standard, a frequency band including the carrier for which the cumulative value that is equal to or greater than a threshold value is obtained.

The calculation unit may obtain, with respect to between all signals transmitted using the same carrier, the correlation value of a signal transmitted at a predetermined time and a signal transmitted at the immediately preceding time, and obtain the cumulative value of the obtained correlation values.

The detection unit may detect, from among carriers for which the cumulative value that is equal to or greater than the threshold value is obtained, the frequency of the carrier having the lowest frequency, as a starting frequency of the frequency band used for the transmission of the signal of the predetermined standard.

The calculation unit may divide the predetermined frequency band into a plurality of sections, obtain the correlation values between signals transmitted using the same carrier, and obtain the cumulative value of the correlation values of each carrier included in the same section, and the detection unit may detect a frequency band including the section for which the cumulative value that is equal to or greater than a threshold value is obtained, as the frequency band used for the transmission of the signal of the predetermined standard.

The calculation unit may obtain, for each of all of the carriers included in the same section, the correlation value of a signal transmitted at a predetermined time and a signal transmitted at the immediately preceding time, and obtain the cumulative value of the obtained correlation values.

The OFDM signal may be a DVB-C2 OFDM signal, and the known signal may be a continual pilot.

According to one aspect of the present technology, an OFDM signal of a predetermined frequency band is received; correlation values between signals transmitted using a carrier used for the transmission of a known signal is obtained, from within the predetermined frequency band; and, on the basis of the correlation values, a frequency band used for the transmission of a signal of a predetermined standard and in which transmission of the known signal is continuously carried out in the same carrier is detected.

Effects of the Invention

According to the present technology, it is possible to promptly detect the location of a frequency band that is used for the transmission of a signal of a predetermined standard.

MODE FOR CARRYING OUT THE INVENTION

Modes for carrying out the present technology are described hereafter. The description is given in the following sequence.
1. First embodiment (example in which a CP correlation value is obtained for each carrier)
2. Second embodiment (example in which a CP correlation value is obtained for each section)

First Embodiment

Detection Principle

Figure 1:
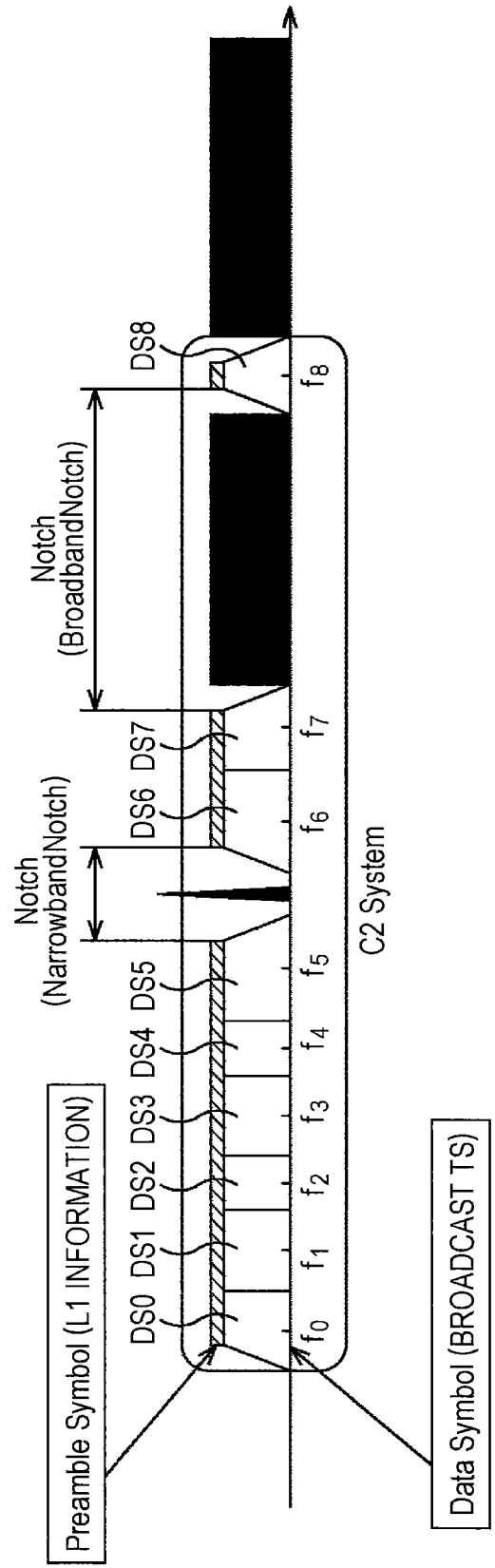
FIG. 1 is a drawing depicting an example of a C2 system.
Figure 2:
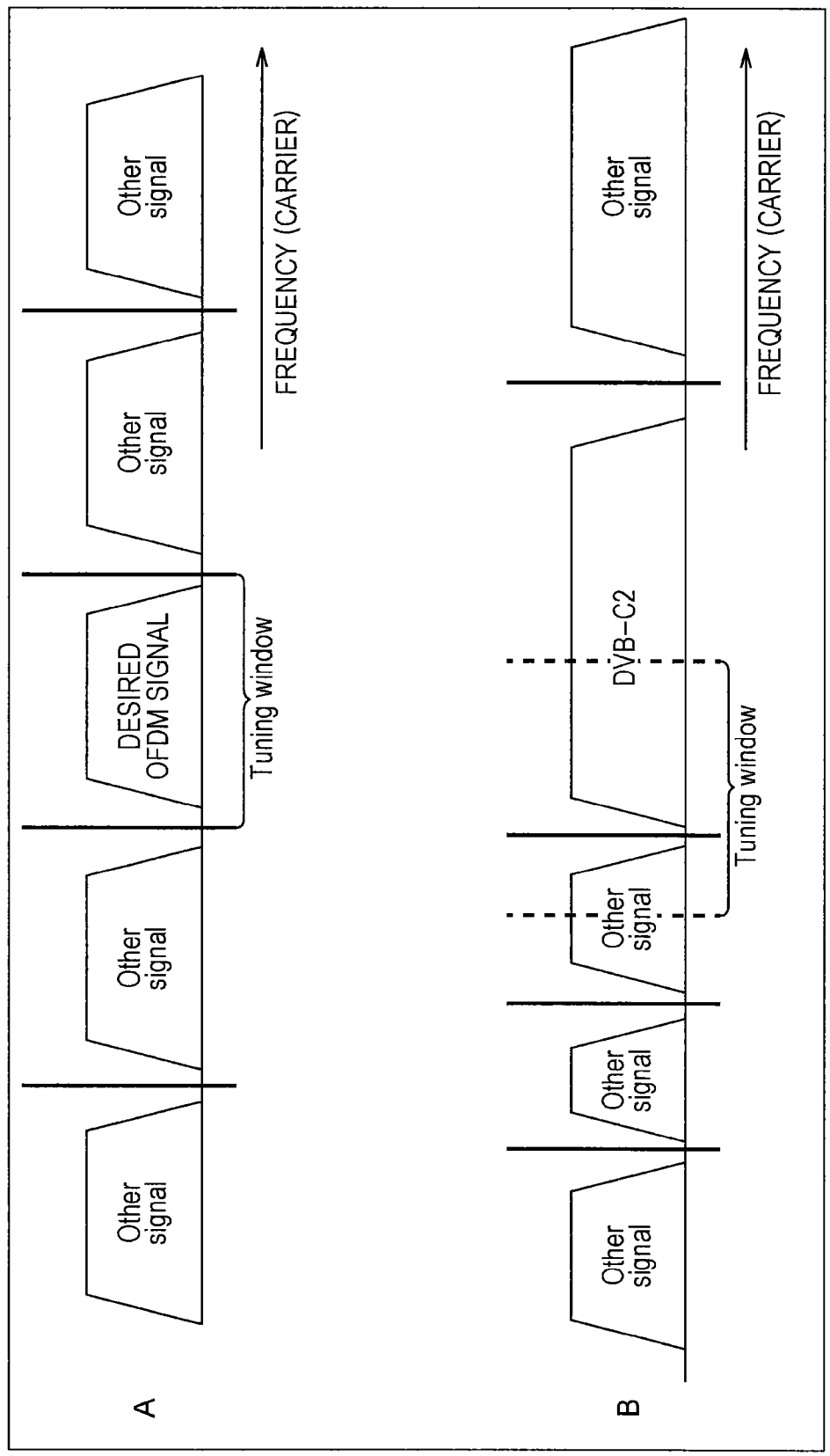
FIG. 2 is a drawing depicting an example of the allocation of frequency bands.
Figure 3:
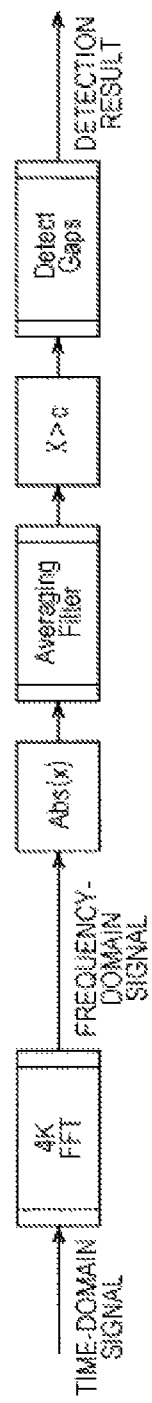
FIG. 3 is a drawing illustrating a system for detecting the frequency band of a DVB-C2 OFDM signal.
Figure 4:
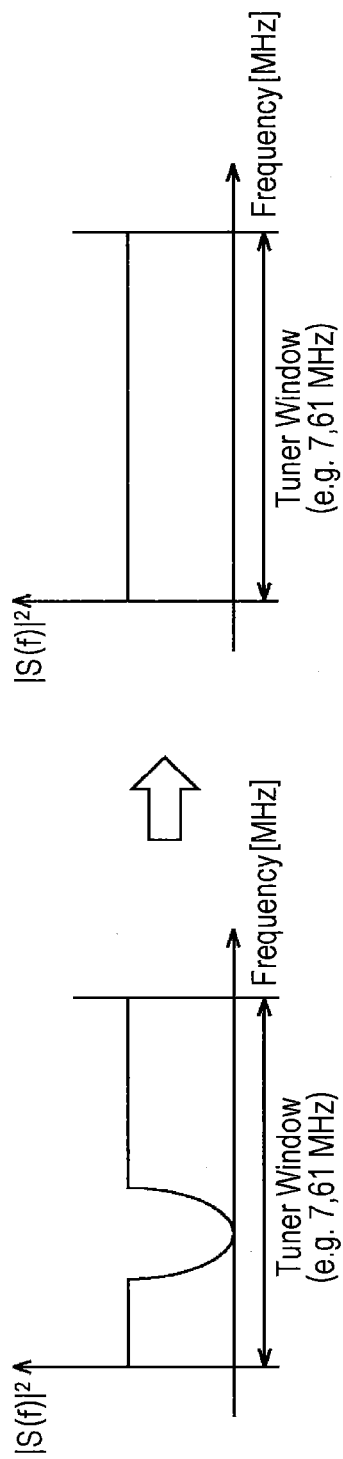
FIG. 4 is a drawing depicting an example of a frequency band.
Figure 5:
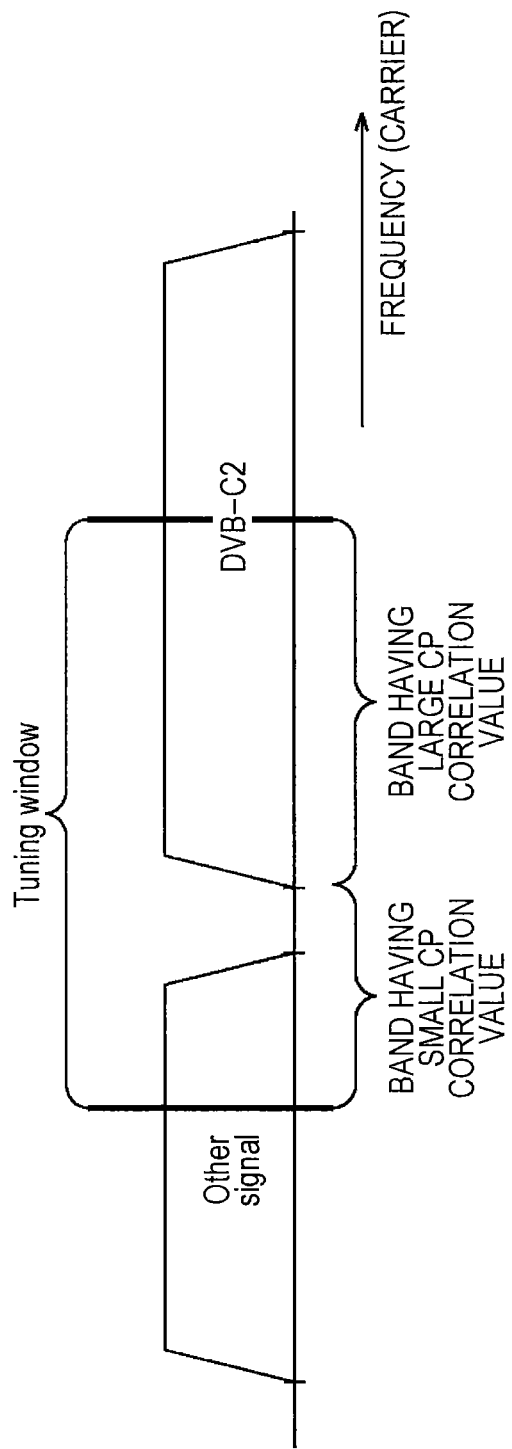
FIG. 5 is a drawing depicting the principle for detecting a frequency band.

FIG. 5 is a drawing depicting the principle for detecting a frequency band used in the transmission of a DVB-C2 OFDM signal, in a reception device according to an embodiment of the present technology. The horizontal axis in FIG. 5 represents frequency.

As depicted in FIG. 5, in the case where a tuning window is set to a predetermined frequency band and signals are received, and CP correlation values that are correlation values between continual pilots of the same carrier are obtained for each carrier used for the transmission of continual pilots, large CP correlation values are obtained in the frequency band of a DVB-C2 OFDM signal. On the other hand, small CP correlation values are obtained outside of the frequency band of a DVB-C2 OFDM signal.

As described hereafter, a continual pilot that constitutes a known signal is included in a DVB-C2 OFDM signal. A continual pilot is continuously transmitted using a predetermined carrier. It is possible to specify a carrier used for transmission of a continual pilot from a DVB-C2 absolute frequency.

Obtaining a CP correlation value for each carrier means that symbols that are transmitted by a carrier specified from an absolute frequency as a carrier used for the transmission of a continual pilot are extracted, and correlation values between the extracted symbols are obtained.

Therefore, symbols used for obtaining CP correlation values are continual pilots in the case where a carrier specified from an absolute frequency is a carrier of the frequency band of a DVB-C2 OFDM signal, and are symbols other than continual pilots in the case where the carrier is a carrier of some other frequency band. Moreover, a CP correlation value is, for example, obtained on the basis of phase differences between symbols transmitted using the same carrier.

A large CP correlation value being obtained in a certain frequency band indicates that the frequency band is a frequency band used for the transmission of a continual pilot, namely the frequency band of a DVB-C2 OFDM signal.

As indicated in FIG. 5, the reception device detects a frequency band for which a large CP correlation value is obtained, as the frequency band of a DVB-C2 OFDM signal, and detects other frequency bands as frequency bands of signals of other standards different from DVB-C2.

In this way, the reception device uses the fact that the arrangement of continual pilots can be specified from an absolute frequency to obtain CP correlation values for each carrier, and detects that a DVB-C2 OFDM signal constituting a desired signal is present in a frequency band for which a large CP correlation value is obtained.

Frequency band detection such as that described above is carried out during a channel scan, for example. The reception device can easily detect the frequency band of a DVB-C2 OFDM signal, and can quickly carryout a channel scan, without having to actually carry out the reception processing stipulated by DVB-C2 after the presence of a signal of a predetermined frequency band is detected.

Hereafter, when appropriate, a carrier specified from an absolute frequency as a carrier used for the transmission of continual pilots is referred to as a CP carrier. Symbols transmitted by a CP carrier are continual pilots in the case where the CP carrier is a carrier within the frequency band of a DVB-C2 OFDM signal, and are symbols that are different from continual pilots in the case where the CP carrier is a carrier within the frequency band of some other signal.

[Exemplary Configuration of a Reception Device]

Figure 6:
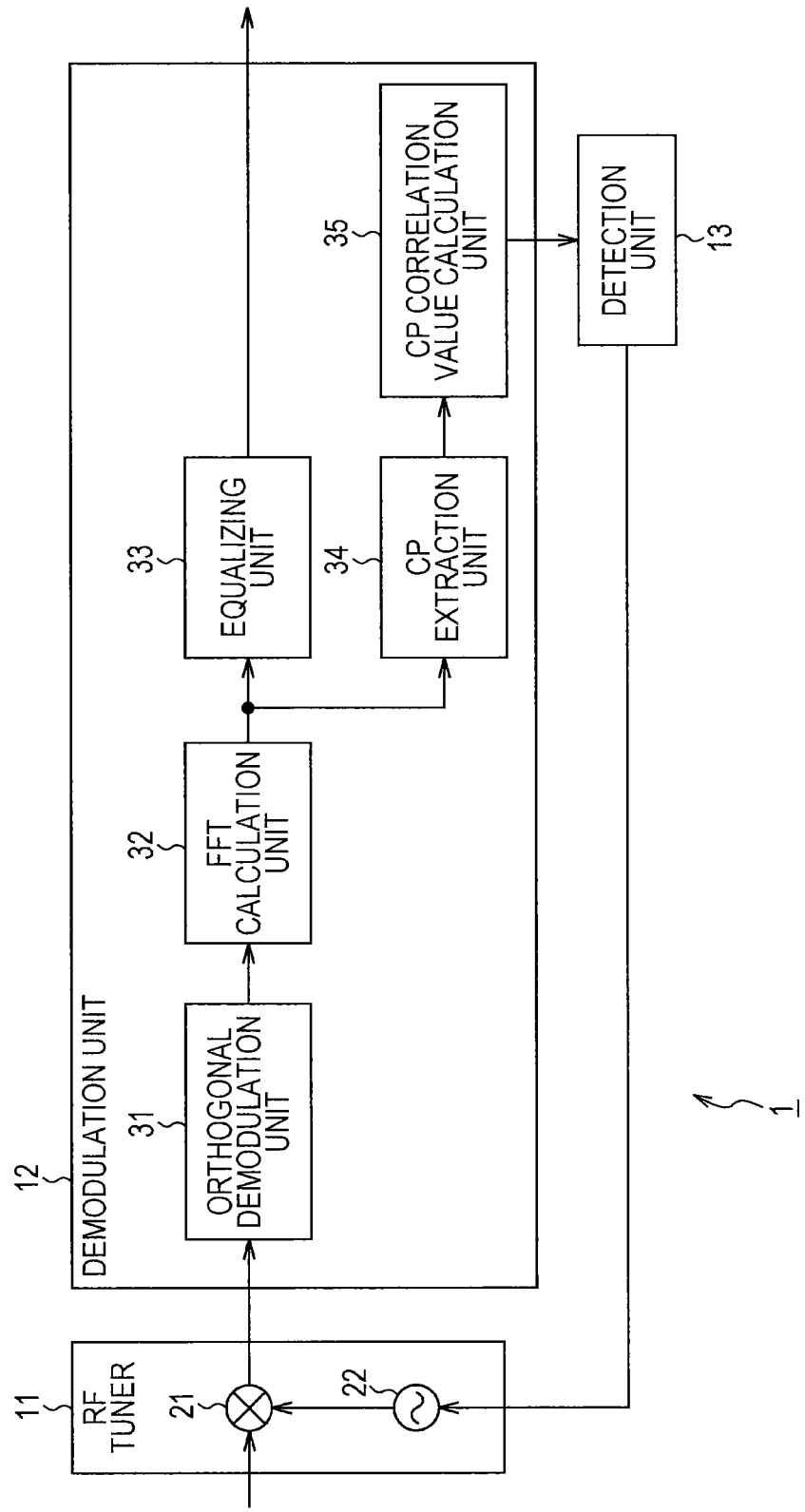
FIG. 6 is a drawing depicting an exemplary configuration of a reception device according to an embodiment of the present technology.

FIG. 6 is a drawing depicting an exemplary configuration of a reception device according to an embodiment of the present technology.

The reception device 1 of FIG. 6 is a reception device that is able to receive DVB-C2 OFDM signals. The reception device 1 includes an RF tuner 11, a demodulation unit 12, and a detection unit 13.

The RF tuner 11 includes a frequency conversion unit 21 and an oscillator 22. The demodulation unit 12 includes an orthogonal demodulation unit 31, an FFT calculation unit 32, an equalizing unit 33, a CP extraction unit 34, and a CP correlation value calculation unit 35. An RF signal input to the reception device 1 via a cable line is input to the frequency conversion unit 21 of the RF tuner 11.

The frequency conversion unit 21 of the RF tuner 11 receives the input RF signal, and carries out frequency conversion of the RF signal on the basis of a signal supplied from the oscillator 22. The frequency conversion unit 21 outputs, to the orthogonal demodulation unit 31, an IF signal obtained by carrying out the frequency conversion.

The oscillator 22 generates a signal of a predetermined frequency in accordance with control performed by the detection unit 13, and outputs the generated signal to the frequency conversion unit 21. On the basis of the signal generated by the oscillator 22, a signal within a tuning window set to a predetermined frequency band is received by the frequency conversion unit 21.

The orthogonal demodulation unit 31 of the demodulation unit 12 carries out orthogonal demodulation with respect to the IF signal supplied from the frequency conversion unit 21. The orthogonal demodulation unit 31 outputs, to the FFT calculation unit 32, a time-domain signal obtained by carrying out the orthogonal demodulation. In the case where the frequency band of a DVB-C2 OFDM signal is included in the frequency band of the reception signal, the time-domain signal that represents symbols such as preamble symbols and data symbols that make up a C2 system is output to the FFT calculation unit 32.

The FFT calculation unit 32 carries out an FFT calculation with respect to the time-domain signal supplied from the orthogonal demodulation unit 31, and outputs a frequency-domain signal. The frequency-domain signal output from the FFT calculation unit 32 is supplied to the equalizing unit 33 and the CP extraction unit 34.

The equalizing unit 33 extracts pilot symbols from the frequency-domain signal supplied from the FFT calculation unit 32, and estimates transmission path characteristics on the basis of the extracted pilot symbols. The equalizing unit 33 carries out equalizing of the frequency-domain signal supplied from the FFT calculation unit 32, by removing transmission path distortion on the basis of the estimated transmission path characteristics, and outputs the equalized signal. The equalized signal output from the equalizing unit 33 is supplied to an error correction unit or the like provided at a stage subsequent to the demodulation unit 12.

The CP extraction unit 34 extracts symbols transmitted using a CP carrier, from the frequency-domain signal supplied from the FFT calculation unit 32. The frequency of the CP carrier is specified by means of a controller or the like that is not depicted.

Figure 7:
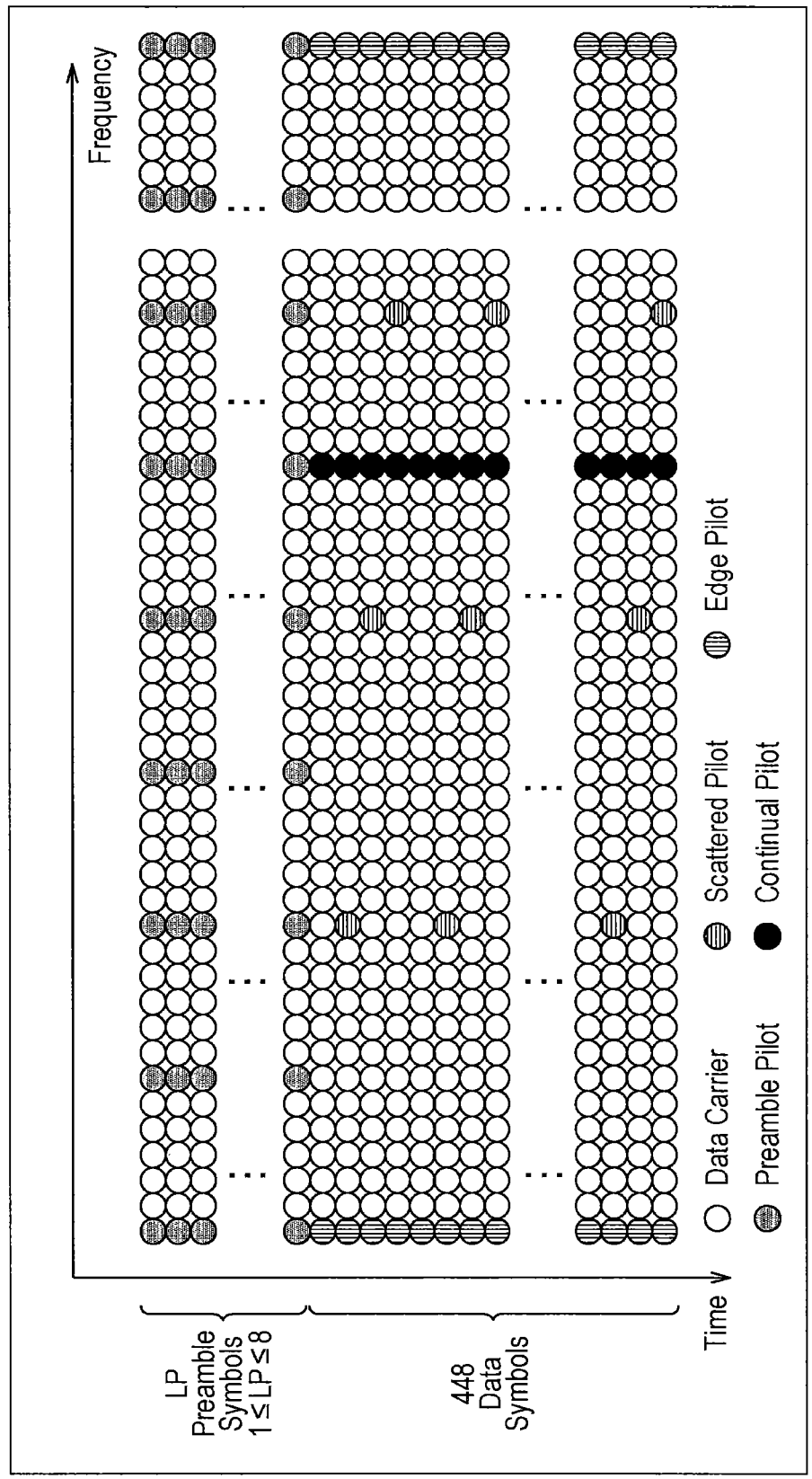
FIG. 7 is a drawing depicting the arrangement of symbols in DVB-C2.

FIG. 7 is a drawing depicting the arrangement of symbols in DVB-C2. The horizontal direction in FIG. 7 represents carriers (frequency), and the vertical direction represents time (symbols). The white round marks represent preamble symbols or data symbols, and the pattern-filled round marks represent pilot signals. The black round marks represent continual pilots.

Preamble pilots are inserted into preamble symbols at six-carrier periods. Furthermore, scattered pilots are periodically inserted into data symbols, and continual pilots are continuously inserted into data symbols. Edge pilots are inserted at both ends of the data symbols. Continual pilots are pilot symbols that are continuously transmitted using the same carrier, in the transmission period of the data symbols. The CP extraction unit 34 outputs, to the CP correlation value calculation unit 35, symbols transmitted using a CP carrier.

The CP correlation value calculation unit 35 obtains CP correlation values for each carrier on the basis of the symbols extracted by the CP extraction unit 34.

For example, the CP correlation value calculation unit 35 targets a CP carrier, and obtains the phase difference between a symbol of a predetermined time and the symbol of the immediately preceding time, with respect to between all symbols transmitted using the same CP carrier. The CP correlation value calculation unit 35 obtains the cumulative value of the phase differences between the symbols, as a CP correlation value of the targeted CP carrier.

In the case where a CP carrier is a carrier that is actually used for the transmission of continual pilots, the symbols that are targets for obtaining phase differences are continual pilots. In this case, for the calculation of a CP correlation value, the phase differences between continual pilots are obtained.

On the other hand, in the case where a CP carrier is a carrier that is not actually used for the transmission of continual pilots, the symbols that are targets for obtaining phase differences are not continual pilots. In this case, for the calculation of a CP correlation value, the phase differences between symbols that are not continual pilots are obtained.

For example, the calculation of the cumulative value of the phase differences between symbols is carried out in such a way that the phase differences between symbols are converted into coordinate vectors on an IQ-plane unit circle, and the absolute value of the cumulative value of the coordinate vectors on the unit circle is calculated. If the phase differences between symbols are θ, the CP correlation value of a predetermined carrier is represented by the following equation (1).

$$CP \text{ correlation value} = |\Sigma e^{j\theta}| \quad (1)$$

Figure 8:
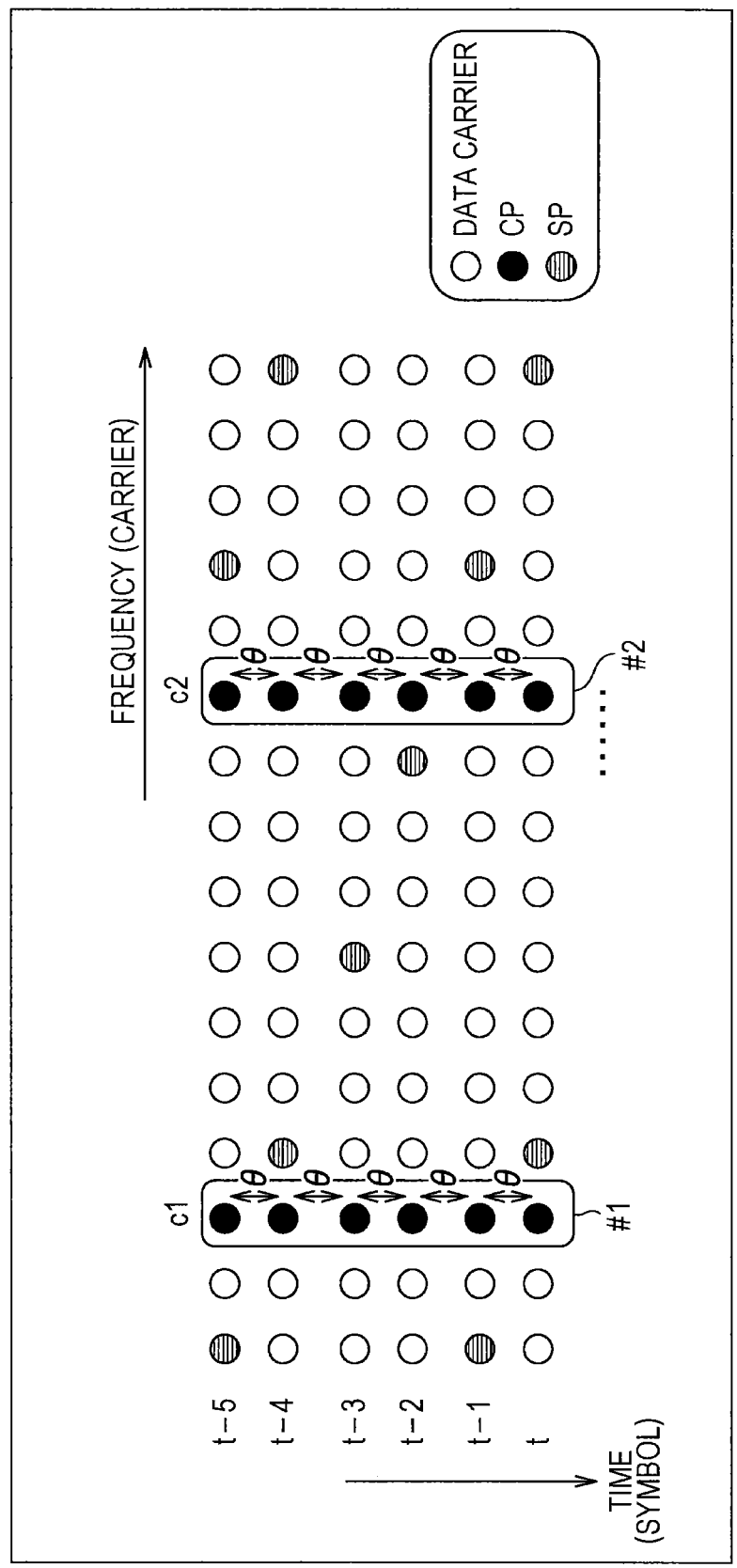
FIG. 8 is a drawing depicting an example of the calculation of a CP correlation value for each carrier.

FIG. 8 is a drawing depicting an example of the calculation of a CP correlation value for each carrier. The horizontal direction in FIG. 8 represents carriers, and the vertical direction represents time.

In the example of FIG. 8, the transmission of continual pilots is carried out using a carrier c1 and a carrier c2, which are CP carriers. Carrier c1 and carrier c2 are specified from the absolute frequency, and the continual pilots that are transmitted using each of these carriers are extracted by the CP extraction unit 34.

The CP correlation value calculation unit 35 targets carrier c1, and, as indicated by the surrounding border #1, the phase differences between continual pilots at points in time, such as between the continual pilots at time t and time t−1 and between the continual pilots at time t−1 and time t−2 and so on, are obtained, and the cumulative value of the obtained phase differences is obtained as the CP correlation value of carrier c1. Furthermore, the CP correlation value calculation unit 35 targets carrier c2, and, as indicated by the surrounding border #2, the phase differences between continual pilots at points in time, such as between the continual pilots at time t and time t−1 and between the continual pilots at time t−1 and time t−2 and so on, are obtained, and the cumulative value of the obtained phase differences is obtained as the CP correlation value of carrier c2.

The CP correlation value calculation unit 35 outputs, to the detection unit 13, the CP correlation value information obtained in this way.

The detection unit 13, on the basis of the CP correlation values obtained by the CP correlation value calculation unit 35, determines a frequency band for which the CP correlation value is larger than a threshold value and a frequency band for which the CP correlation value is smaller than the threshold value, and detects the frequency band for which the CP correlation value is larger than the threshold value as the frequency band of a DVB-C2 OFDM signal. The detection unit 13 stores information of the detected frequency band in an internal memory or the like.

Furthermore, in the case where a DVB-C2 OFDM signal is received, the detection unit 13 sets a tuning window to the band detected as the frequency band of a DVB-C2 OFDM signal, and controls the frequency of the oscillator 22 in such away that a signal within the tuning window is received.

Figure 9:
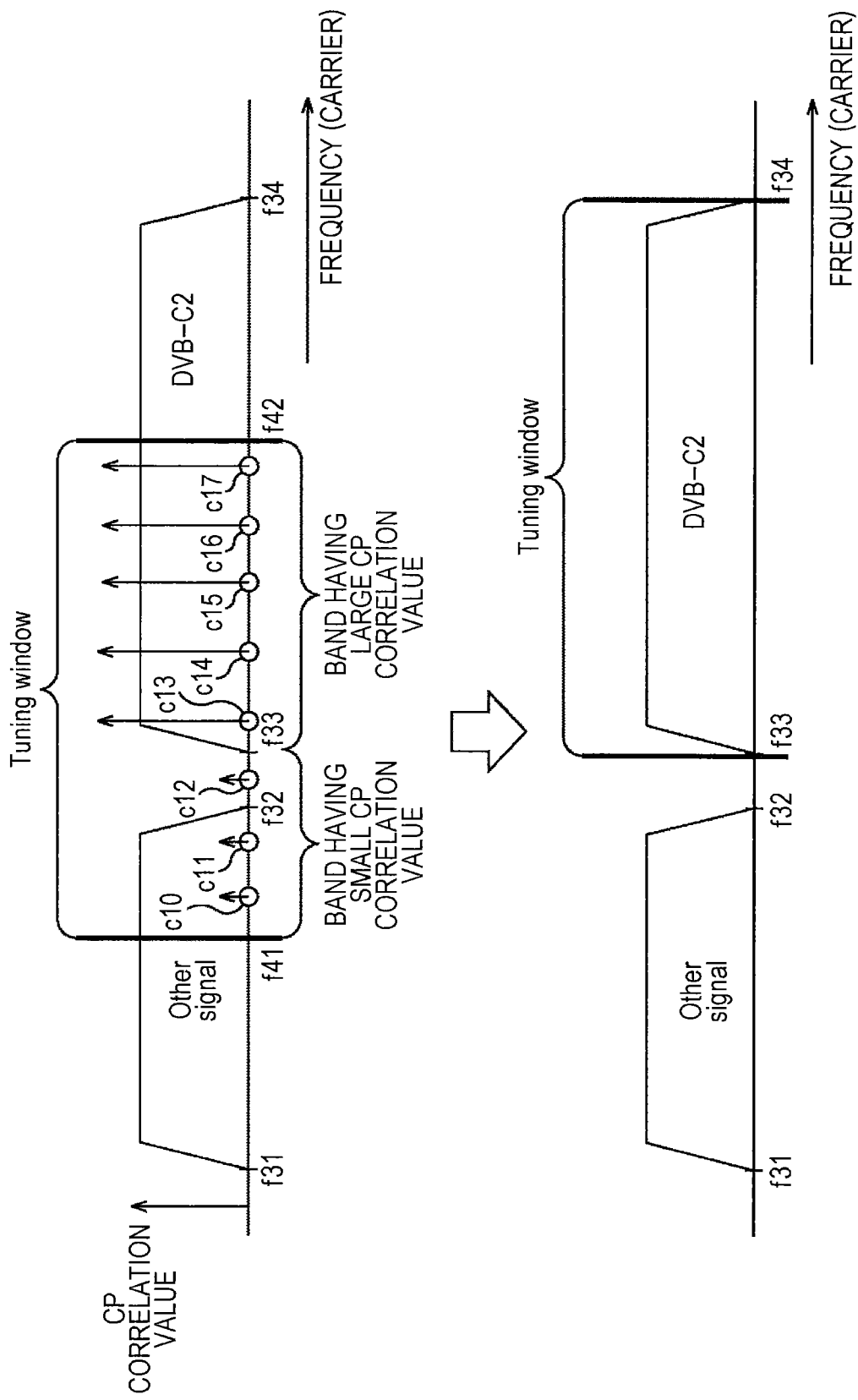
FIG. 9 is a drawing depicting an example of the detection of the frequency band of a DVB-C2 OFDM signal.

FIG. 9 is a drawing depicting an example of the detection of the frequency band of a DVB-C2 OFDM signal. The horizontal axis of FIG. 9 represents frequency.

In the upper stage of FIG. 9, the band of frequencies f31 to f32 is the frequency band of a signal of another standard different from DVB-C2, and the band of frequencies f33 to f34 is the frequency band of a DVB-C2 OFDM signal. For example, the bandwidth of the frequency band from frequencies f33 to f34 has the same width as the bandwidth of the tuning window. The tuning window is set in such a way that a signal of a frequency band from a frequency f41 that is a frequency between the frequencies f31 and f32 to a frequency f42 that is a frequency between the frequencies f33 and f34 is received.

Furthermore, on the basis of the absolute frequency, the carriers c10 to c17 are specified as CP carriers. The carriers c10 to c12 are CP carriers outside the frequency band of the DVB-C2 OFDM signal, and the carriers c13 to c17 are CP carriers within the frequency band of the DVB-C2 OFDM signal.

In this case, as depicted in the upper stage of FIG. 9, a CP correlation value smaller than the threshold value is obtained in the carriers c10 to c12, and a CP correlation value larger than the threshold value is obtained in the carriers c13 to c17. The detection unit 13 detects the frequency band including the carriers c13 to c17 as the frequency band of a DVB-C2 OFDM signal.

In the case where a DVB-C2 OFDM signal is received, as depicted in the lower stage of FIG. 9, the detection unit 13 sets the tuning window in such a way that, from among the CP carriers for which a CP correlation value larger than the threshold value is obtained, the frequency of carrier c14 that is the CP carrier having the lowest frequency serves as the starting frequency, and controls the oscillator 22. Thus, it becomes possible to receive a DVB-C2 OFDM signal for which transmission is carried out using a frequency band detected on the basis of the CP correlation values of each carrier.

The tuning window may be set in such a way that, from among the CP carriers for which a CP correlation value larger than the threshold value is obtained, the frequency of carrier c17 that is the CP carrier having the highest frequency serves as the ending frequency.

[Operation of a Reception Device]

Figure 10:
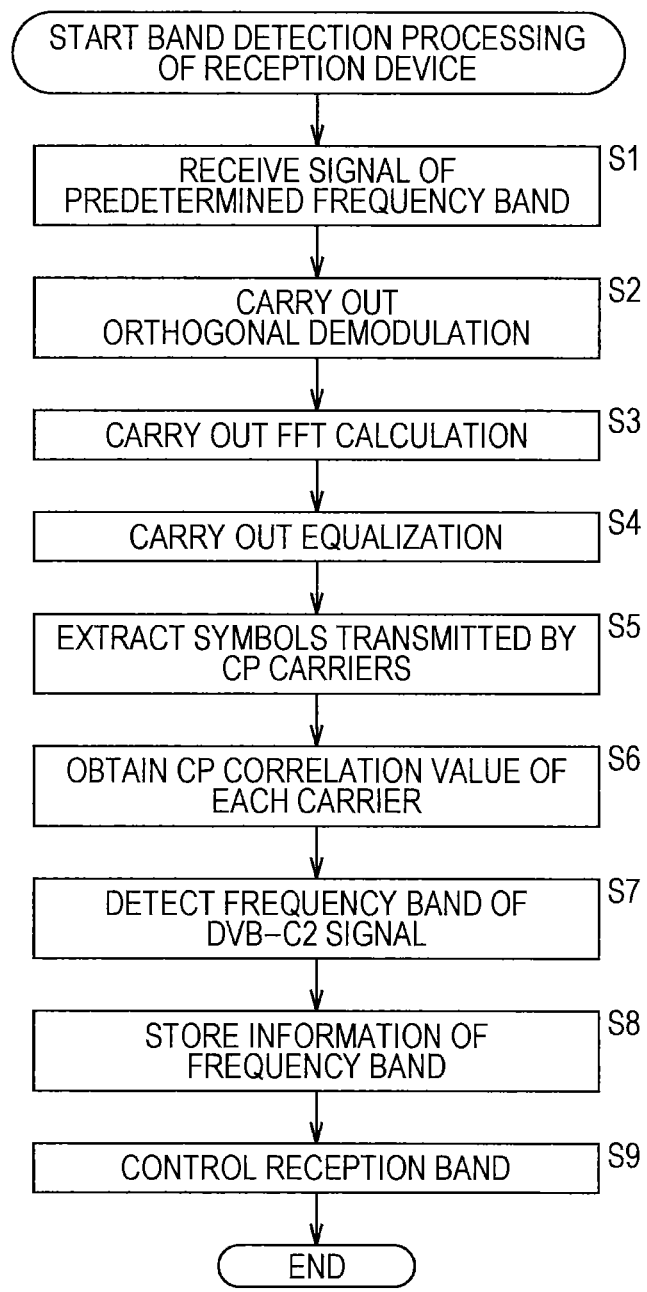
FIG. 10 is a flowchart illustrating the processing of a reception device.

Here, with reference to the flowchart of FIG. 10, a description is given with respect to the processing of the reception device 1 that detects the frequency band of a DVB-C2 OFDM signal. The processing of FIG. 10 is started when a channel scan for example is instructed.

In step S1, the frequency conversion unit 21 of the RF tuner 11 carries out frequency conversion for an RF signal, and receives a signal of a predetermined frequency band.

In step S2, the orthogonal demodulation unit 31 of the demodulation unit 12 carries out orthogonal demodulation with respect to the signal received by the frequency conversion unit 21, and outputs a time-domain signal representing symbols.

In step S3, the FFT calculation unit 32 carries out an FFT calculation with respect to the time-domain signal supplied from the orthogonal demodulation unit 31.

In step S4, the equalizing unit 33 carries out equalizing of a frequency-domain signal supplied from the FFT calculation unit 32, and outputs the equalized signal.

In step S5, the CP extraction unit 34 extracts, from the frequency-domain signal, symbols transmitted in all CP carriers.

In step S6, on the basis of the symbols extracted by the CP extraction unit 34, the CP correlation value calculation unit 35 obtains the phase difference between a symbol of a predetermined time and the symbol of the immediately preceding time, with respect to between all symbols transmitted using the same CP carrier, and obtains the cumulative value of the phase differences between symbols as the CP correlation value of each carrier.

In step S7, the detection unit 13 detects, as the frequency band of a DVB-C2 OFDM signal, the frequency band including a CP carrier for which a CP correlation value larger than a threshold value is obtained.

In step S8, the detection unit 13 stores information of the detected frequency band of a DVB-C2 OFDM signal, in an internal memory or the like.

In the case where a DVB-C2 OFDM signal is received, in step S9, the detection unit 13 sets a tuning window to the detected band, and controls the frequency of the oscillator 22 in such a way that a signal within the tuning window is received. Thereafter, the processing of the detection unit 13 is finished.

As result of the above processing, a frequency band used for the transmission of a DVB-C2 OFDM signal can be quickly detected while ensuring high reliability, even when the allocation of frequency bands for signals cannot be predicted.

Second Embodiment

Figure 11:
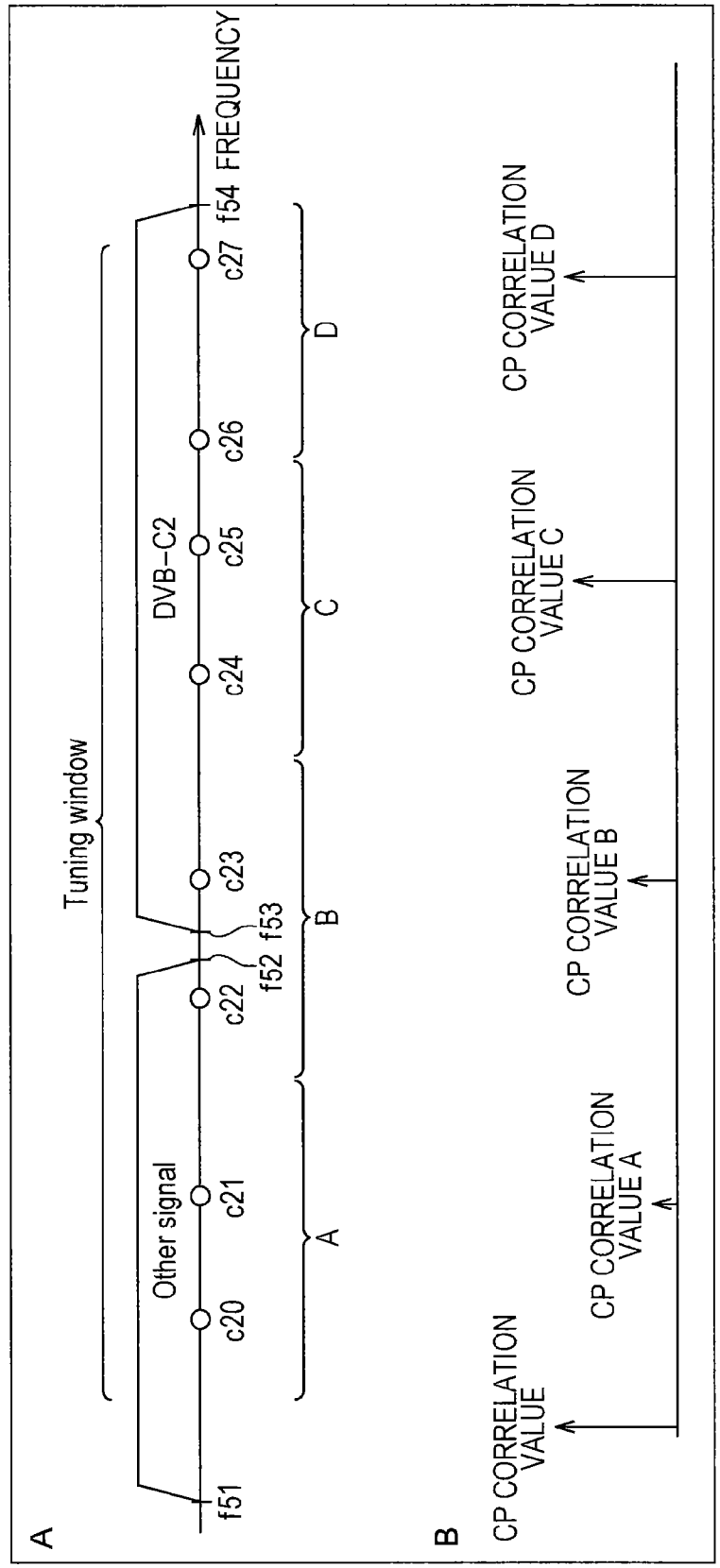
FIG. 11 is a drawing depicting another example of the detection of the frequency band of a DVB-C2 OFDM signal.

FIG. 11 is a drawing depicting another example of the detection of the frequency band of a DVB-C2 OFDM signal. In this example, a CP correlation value for each section is obtained, and the frequency band of a DVB-C2 OFDM signal is detected on the basis of the CP correlation values for each section.

In A of FIG. 11, the band of frequencies f51 to f52 is the frequency band of a signal of another different standard, and the band of frequencies f53 to f54 is the frequency band of a DVB-C2 OFDM signal.

Furthermore, on the basis of the absolute frequency, carriers c20 to c27 are specified as CP carriers. Carriers c20 to c22 are carriers from within the frequency band of the signal of the other standard, and carriers c23 to c27 are carriers from within the frequency band of the DVB-C2 OFDM signal. A tuning window is set to the frequency band including the carriers c20 to c27.

In this case, the CP extraction unit 34 extracts symbols transmitted in the carriers c20 to c27.

The CP correlation value calculation unit 35 divides, into a plurality of sections, the frequency band for which the tuning window is set, and obtains the CP correlation value for each section on the basis of the symbols transmitted by the CP carriers included in each section.

In the example of A in FIG. 11, the frequency band is divided into the four sections of sections A to D. Carrier c20 and carrier c21 are included in section A, and carrier c22 and carrier c23 are included in section B. Carrier c24 and carrier c25 are included in section C, and carrier c26 and carrier c27 are included in section D.

The CP correlation value calculation unit 35 obtains a CP correlation value A for section A on the basis of the symbols transmitted by carrier c20 and carrier c21 and extracted by the CP extraction unit 34, and obtains a CP correlation value B for section B on the basis of the symbols transmitted by carrier c22 and carrier c23. Furthermore, the CP correlation value calculation unit 35 obtains a CP correlation value C for section C on the basis of the symbols transmitted by carrier c24 and carrier c25, and obtains a CP correlation value D for section D on the basis of the symbols transmitted by carrier c26 and carrier c27.

In this case, as depicted in B of FIG. 11, the CP correlation values for sections B, C, and D obtained on the basis of the symbols transmitted by the CP carriers included in the frequency band of the DVB-C2 OFDM signal are larger, and the CP correlation value for section A obtained on the basis of the symbols transmitted by the CP carrier not included in the frequency band of the DVB-C2 OFDM signal are smaller. The magnitude of the CP correlation value for each section changes in accordance with the number of CP carriers included within the section and included in the frequency band of the DVB-C2 OFDM signal.

In the example of B in FIG. 11, the CP correlation value C and the CP correlation value D are large values due to there being, in each of the sections thereof, two CP carriers that are included in the frequency band of the DVB-C2 OFDM signal. Furthermore, the CP correlation value A is a small value due to there not being, in section A, a CP carrier that is included in the frequency band of the DVB-C2 OFDM signal. The CP correlation value B is smaller than the CP correlation values C and D and is larger than the CP correlation value A due to there being, in section B, one CP carrier that is included in the frequency band of the DVB-C2 OFDM signal.

The detection unit 13 detects that, for example, the frequency band including sections B, C, and D is the frequency band of the DVB-C2 OFDM signal, on the basis of the CP correlation values of each section obtained by the CP correlation value calculation unit 35. Furthermore, the detection unit 13 detects that, for example, the frequency band of the DVB-C2 OFDM signal starts from a predetermined carrier within section B for which a CP correlation value smaller than those of sections C and D is obtained.

Although there is a drop in accuracy in the frequency direction, by using the CP correlation value of each section in the detection of the frequency band of a DVB-C2 OFDM signal, the amount of calculation is suppressed in comparison to the case where a CP correlation value is obtained for each carrier as described above, and a channel scan can be quickly carried out.

Figure 12:
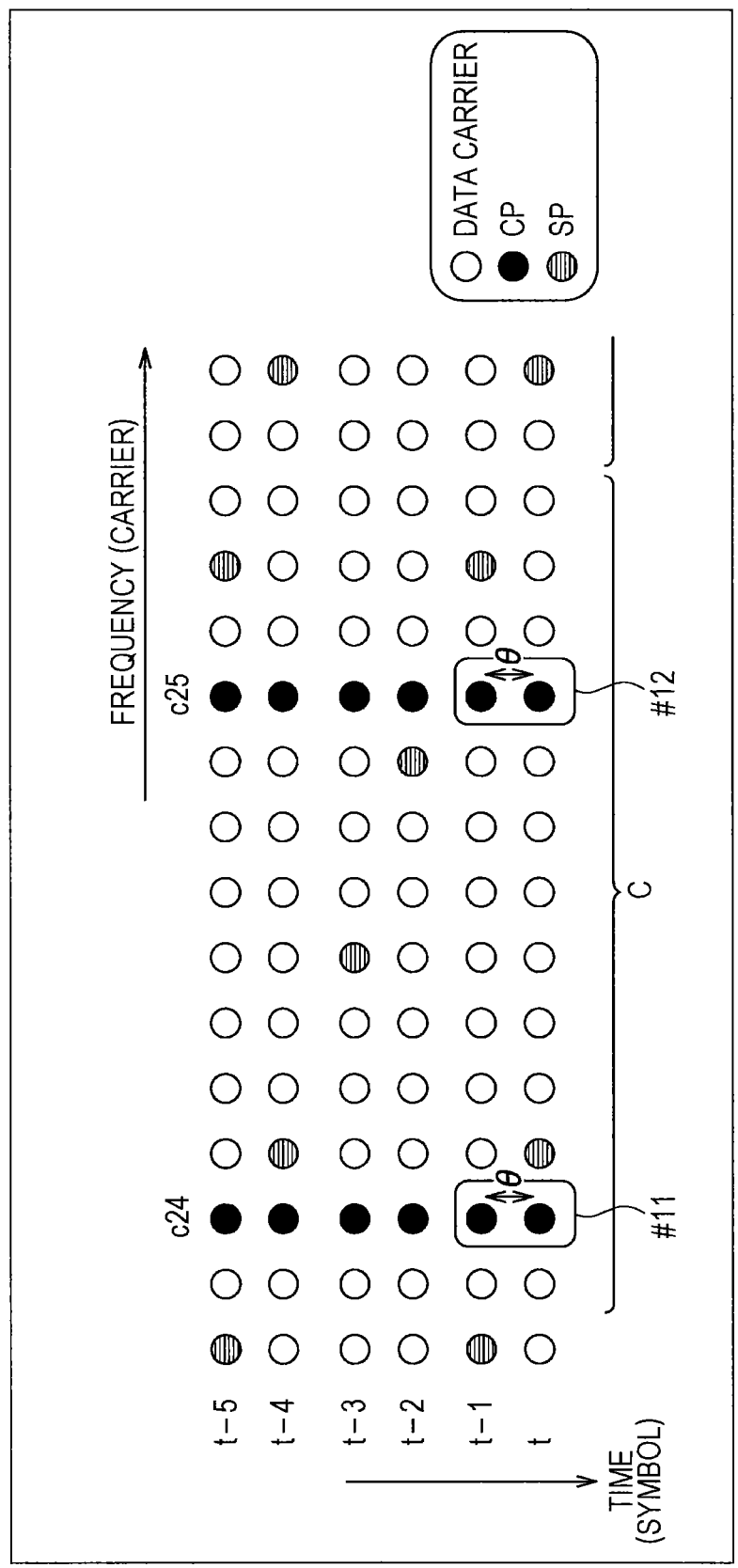
FIG. 12 is a drawing depicting an example of the calculation of a CP correlation value for each section.

FIG. 12 is a drawing depicting an example of the calculation of a CP correlation value for each section by the CP correlation value calculation unit 35. The horizontal direction in FIG. 12 represents carriers, and the vertical direction represents time.

In the example of FIG. 12, the transmission of continual pilots is carried out in carrier c24 and carrier c25, which are CP carriers within section C. Carrier c24 and carrier c25 are specified from the absolute frequency, and the continual pilots that are transmitted using each of these carriers are extracted by the CP extraction unit 34.

The CP correlation value calculation unit 35 targets carrier c24, and, as indicated by the surrounding border #11, obtains the phase difference between a continual pilot at time t and a continual pilot at time t−1 that is the immediately preceding time. Furthermore, the CP correlation value calculation unit 35 targets carrier c25, and, as indicated by the surrounding border #12, obtains the phase difference between a continual pilot at time t and a continual pilot at time t−1 that is the immediately preceding time.

In the case where all of the CP carriers included in section C are targeted and the phase differences between continual pilots at time t and continual pilots at time t−1 that is the immediately preceding time are obtained, the CP correlation value calculation unit 35 obtains the cumulative value of the obtained phase differences as the CP correlation value of section C.

In the detection unit 13, CP correlation values obtained by the CP correlation value calculation unit 35 in this way are used for the detection of the frequency band of a DVB-C2 OFDM signal. In the example of FIG. 12, only the one phase difference of the phase difference between the continual pilot at time t and the continual pilot at time t−1 is obtained from one CP carrier; however, a plurality of phase differences may be obtained from one CP carrier, and the cumulative value thereof may be obtained as the CP correlation value of each section.

Figure 13:
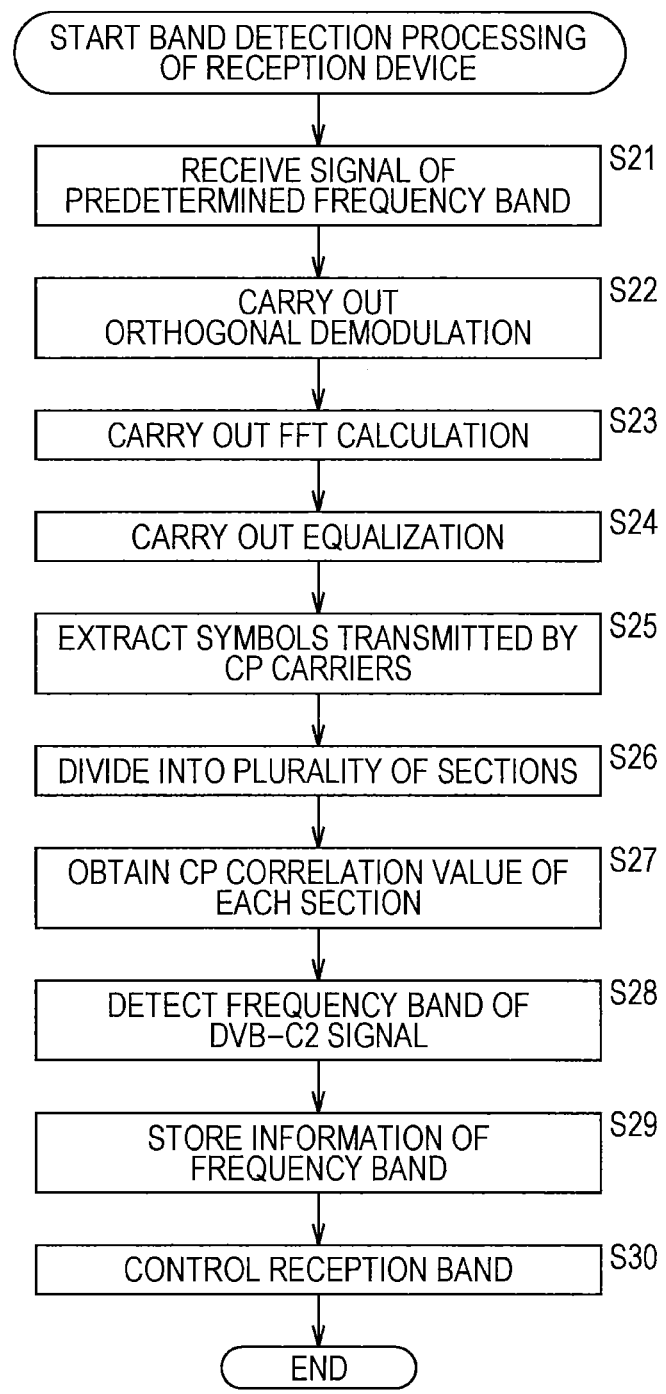
FIG. 13 is a flowchart illustrating other processing of a reception device.

Here, with reference to the flowchart of FIG. 13, a description is given with respect to the processing of the reception device 1 that detects the frequency band of a DVB-C2 OFDM signal as described with reference to FIG. 11 and FIG. 12. The processing of FIG. 13 is started when a channel scan for example is instructed.

In step S21, the frequency conversion unit 21 of the RF tuner 11 carries out frequency conversion of an RF signal, and receives a signal of a predetermined frequency band.

In step S22, the orthogonal demodulation unit 31 of the demodulation unit 12 carries out orthogonal demodulation with respect to the signal received by the frequency conversion unit 21, and outputs a time-domain signal representing symbols.

In step S23, the FFT calculation unit 32 carries out an FFT calculation with respect to the time-domain signal supplied from the orthogonal demodulation unit 31.

In step S24, the equalizing unit 33 carries out equalizing of a frequency-domain signal supplied from the FFT calculation unit 32, and outputs the equalized signal.

In step S25, the CP extraction unit 34 extracts, from the frequency-domain signal, symbols transmitted in all CP carriers.

In step S26, the CP correlation value calculation unit 35 divides, into a plurality of sections, a frequency band for which a tuning window is set.

In step S27, on the basis of the symbols extracted by the CP extraction unit 34, the CP correlation value calculation unit 35 obtains, as CP correlation values of each section, the cumulative value of phase differences between continual pilots of a predetermined time and continual pilots of the immediately preceding time that are transmitted using CP carriers included in the same section.

In step S28, the detection unit 13 detects, as the frequency band of a DVB-C2 OFDM signal, the frequency band including a section for which a CP correlation value larger than a threshold value is obtained.

In step S29, the detection unit 13 stores information of the detected frequency band of the DVB-C2 OFDM signal, in an internal memory or the like.

In the case where a DVB-C2 OFDM signal is received, in step S30, the detection unit 13 sets a tuning window to the detected frequency band, and controls the frequency of the oscillator 22 in such a way that a signal within the tuning window is received. Thereafter, the processing of the detection unit 13 is finished.

As result of the above processing also, a channel scan when the allocation of frequency bands for signals cannot be predicted can be quickly carried out.

Modified Example

In the above description, the CP correlation value of each carrier or each section is obtained on the basis of the phase differences of continual pilots; however, the signals used for obtaining phase differences are not restricted to continual pilots. As long as a signal is one that is continuously transmitted using the same carrier, the signal can be used to obtain a phase difference, and, for example, the edge pilots described with reference to FIG. 7 can also be used.

Furthermore, a description has been given with respect to the case where a frequency band used for the transmission of a DVB-C2 OFDM signal is detected; however, the aforementioned processing can also be applied to the detection of the frequency band of an OFDM signal of another standard as long as the standard is one in which the same carrier is used for the continuous transmission of a known signal.

[Exemplary Configuration of a Reception System]

Figure 14:
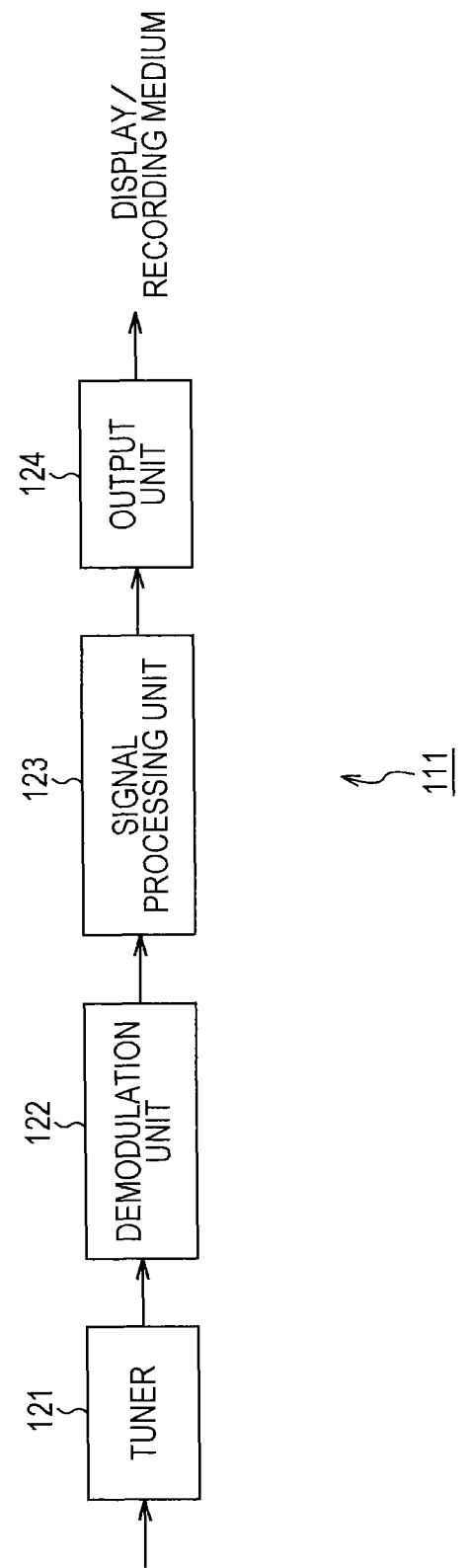
FIG. 14 is a block diagram depicting an exemplary configuration of a reception system.

FIG. 14 is a block diagram depicting an exemplary configuration of a reception system.

The reception system 111 of FIG. 14 includes a tuner 121, a demodulation unit 122, a signal processing unit 123, and an output unit 124.

The tuner 121 receives a signal transmitted via a transmission path such as a terrestrial digital broadcast, a satellite digital broadcast, a CATV network, or the Internet, and outputs the signal to the demodulation unit 122. The aforementioned RF tuner 11 is included in the tuner 121.

The demodulation unit 122 carries out, with respect to the signal supplied from the tuner 121, transmission path decoding processing including demodulation processing and error correction processing, and outputs data obtained by the transmission path decoding processing to the signal processing unit 123. The aforementioned demodulation unit 12 is included in the demodulation unit 122.

The signal processing unit 123, with respect to the data obtained by the transmission path decoding processing, appropriately carries out signal processing such as decompression processing and descrambling processing, and acquires transmission-target data. The aforementioned header processing unit 101 and the header processing unit 102 are included in the signal processing unit 123.

Decompression processing by the signal processing unit 123 is carried out with respect to transmission-target data such as images and audio in the case where compression is carried out at the transmission side using a predetermined system such as MPEG. Furthermore, the descrambling processing is carried out in the case where scrambling is carried out at the transmission side with respect to the transmission-target data. The signal processing unit 123 outputs, to the output unit 124, transmission-target data obtained by appropriately carrying out signal processing.

In the case where an image is to be displayed on the basis of the data supplied from the signal processing unit 123, the output unit 124 carries out processing such as D/A conversion with respect to the data supplied from the signal processing unit 123. The output unit 124 outputs an image signal obtained by processing such as D/A conversion being carried out, to a display provided in the reception system 111 or to a display that is external to the reception system 111, and causes an image to be displayed.

Furthermore, in the case where the data supplied from the signal processing unit 123 is to be recorded on a recording medium, the output unit 124 outputs the data supplied from the signal processing unit 123, to an internal recording medium of the reception system 111, or to an external recording medium, and causes the data to be recorded. The recording medium is constituted by a hard disk, a flash memory, an optical disk, or the like. An external recording medium may not just be a recording medium that is externally mounted in the reception system 111, but may also be a recording medium that is connected via a network.

The reception system 111 having a configuration such as that described above may be constituted by hardware such as an IC (integrated circuit) chip, or may be constituted from a component such as a board that is constituted by an arrangement of a plurality of IC chips, or from an independent device that includes such a component.

It is possible for each of the tuner 121, the demodulation unit 122, the signal processing unit 123, and the output unit 124 to be constituted as a single independent piece of hardware, or as a software module. Furthermore, it is permissible for a combination of two or more from among the tuner 121, the demodulation unit 122, the signal processing unit 123, and the output unit 124 to be constituted as a single independent piece of hardware, or as a software module. For example, it is possible for the tuner 121 and the demodulation unit 122 to be constituted by a single piece of hardware and so on, and for the signal processing unit 123 and the output unit 124 to be constituted by a single piece of hardware and so on.

The reception system 111 can be, for example, applied to a TV that receives a television broadcast as a digital broadcast, a radio receiver that receives a radio broadcast, or a recording device or the like that records a television broadcast.

[Exemplary Configuration of a Computer]

The aforementioned series of processing can be executed by hardware, or can be executed by software. In the case where the series of processing is executed by software, a program constituting that software is installed from a program recording medium onto a computer that is incorporated in dedicated hardware, or onto a general-purpose personal computer or the like.

Figure 15:
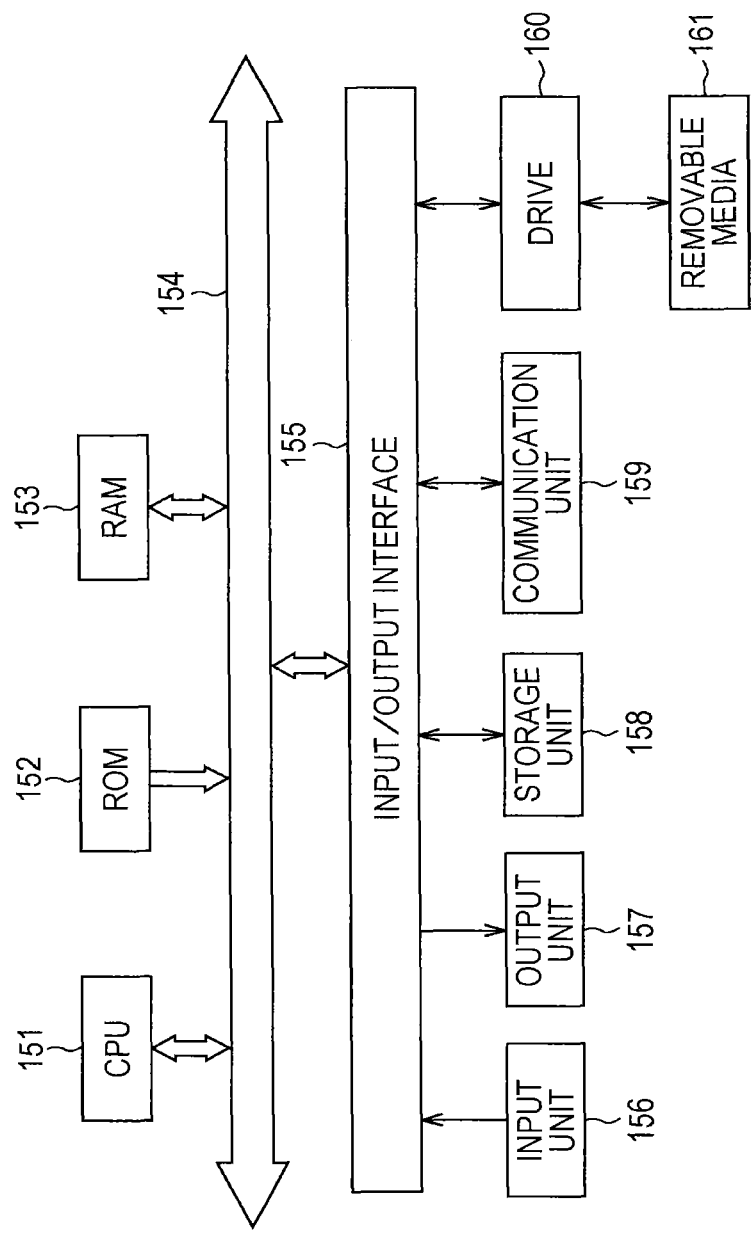
FIG. 15 is a block diagram depicting an exemplary configuration of a computer.

FIG. 15 is a block diagram depicting an exemplary configuration of computer hardware in which the aforementioned series of processing is executed by a program.

A CPU (central processing unit) 151, a ROM (read only memory) 152, and a RAM (random access memory) 153 are connected to each other by means of a bus 154.

In addition, an input/output interface 155 is connected to the bus 154. An input unit 156 constituted by a keyboard or a mouse or the like, and an output unit 157 constituted by a display or a speaker or the like are connected to the input/output interface 155. Furthermore, a storage unit 158 constituted by a hard disk or a nonvolatile memory or the like, a communication unit 159 constituted by a network interface or the like, and a drive 160 that drives removable media 161 are connected to the input/output interface 155.

In a computer configured as described above, the CPU 151, for example, loads a program stored in the storage unit 158 onto the RAM 153 via the input/output interface 155 and the bus 154 and executes the program, and the aforementioned series of processing is thereby carried out.

The program executed by the CPU 151 is stored on the removable media 161 for example, or is provided via a wired or wireless transmission medium such as a local area network, the Internet, or a digital broadcast, and is installed in the storage unit 158.

Moreover, a program executed by the computer may be a program with which processing is carried out in a time-series manner according to the sequence described in the present specification, or may be a program with which processing is carried out in parallel or at a necessary timing such as when a call is made.

The embodiments of the present technology are not restricted to the aforementioned embodiments, and various alterations are possible within a scope that does not deviate from the purpose of the present technology.

[Example of a Combined Configuration]

The present technology can also have a configuration such as the following.

(1)

A reception device including:

a reception unit that receives an OFDM signal of a predetermined frequency band;

a calculation unit that obtains correlation values between signals transmitted using a carrier used for the transmission of a known signal, from within the predetermined frequency band; and a detection unit that, on the basis of the correlation values, detects a frequency band used for the transmission of a signal of a predetermined standard and in which transmission of the known signal is continuously carried out in the same carrier.

(2)

The reception device according to (1), wherein the calculation unit, for each carrier, obtains a cumulative value of the correlation values between signals transmitted using the same carrier, and the detection unit detects, as the frequency band used for the transmission of the signal of the predetermined standard, a frequency band including the carrier for which the cumulative value that is equal to or greater than a threshold value is obtained.

(3)

The reception device according to (2), wherein the calculation unit obtains, with respect to between all signals transmitted using the same carrier, the correlation value of a signal transmitted at a predetermined time and a signal transmitted at the immediately preceding time, and obtains the cumulative value of the obtained correlation values.

(4)

The reception device according to (2) or (3), wherein the detection unit detects, from among carriers for which the cumulative value that is equal to or greater than the threshold value is obtained, the frequency of the carrier having the lowest frequency, as a starting frequency of the frequency band used for the transmission of the signal of the predetermined standard.

(5)

The reception device according to (1), wherein the calculation unit divides the predetermined frequency band into a plurality of sections, obtains the correlation values between signals transmitted using the same carrier, and obtains the cumulative value of the correlation values of each carrier included in the same section, and the detection unit detects a frequency band including the section for which the cumulative value that is equal to or greater than a threshold value is obtained, as the frequency band used for the transmission of the signal of the predetermined standard.

(6)

The reception device according to (5), wherein the calculation unit obtains, for each of all of the carriers included in the same section, the correlation value of a signal transmitted at a predetermined time and a signal transmitted at the immediately preceding time, and obtains the cumulative value of the obtained correlation values.

(7)

The reception device according to any of (1) to (6), wherein the OFDM signal is a DVB-C2 OFDM signal, and the known signal is a continual pilot.

(8)

A reception method including steps of:

receiving an OFDM signal of a predetermined frequency band;

obtaining correlation values between signals transmitted using a carrier used for the transmission of a known signal, from within the predetermined frequency band; and on the basis of the correlation values, detecting a frequency band used for the transmission of a signal of a predetermined standard and in which transmission of the known signal is continuously carried out in the same carrier.

(9)

A program that executes, on a computer, processing including steps of:

receiving an OFDM signal of a predetermined frequency band;

obtaining correlation values between signals transmitted using a carrier used for the transmission of a known signal, from within the predetermined frequency band; and on the basis of the correlation values, detecting a frequency band used for the transmission of a signal of a predetermined standard and in which transmission of the known signal is continuously carried out in the same carrier.

(10)

A reception system including:

a reception unit that receives an OFDM signal of a predetermined frequency band transmitted via a transmission path;

a demodulation unit that carries out demodulation processing of the OFDM signal received by the reception unit;

a signal processing unit that carries out signal processing on data demodulated by the demodulation unit, and acquires transmission-target data; and an output unit that outputs the transmission-target data acquired by the signal processing unit, wherein the demodulation unit includes:

a calculation unit that obtains correlation values between signals transmitted using a carrier used for the transmission of a known signal, from within the predetermined frequency band; and a detection unit that, on the basis of the correlation values, detects a frequency band used for the transmission of a signal of a predetermined standard and in which transmission of the known signal is continuously carried out in the same carrier.

REFERENCE SIGNS LIST

1 Reception device
11 RF tuner
12 Demodulation unit
13 Detection unit
21 Frequency conversion unit
22 Oscillator
31 Orthogonal demodulation unit
32 FFT calculation unit
33 Equalizing unit
34 CP extraction unit
35 CP correlation value calculation unit

The invention claimed is:

1. A reception device comprising:
a RF tuner comprising a frequency conversion unit that receives an Orthogonal Frequency Division Multiplex (OFDM) signal of a predetermined frequency band; and
a central processing unit (CPU) operable to:
obtain a correlation value between a signal transmitted at a predetermined time and a signal transmitted at a time immediately preceding the predetermined time, for all signals transmitted using a same carrier that is used for transmission of a known signal, from within the predetermined frequency band; and
detect, based on the obtained correlation values, a frequency band used for the transmission of a signal of a predetermined standard and in which the transmission of the known signal is continuously carried out in the same carrier.

2. The reception device according to claim 1, wherein the CPU is further operable to:
obtain, for each carrier, a cumulative value of the obtained correlation values between all the signals transmitted using the same carrier, and
detect, as the frequency band used for the transmission of the signal of the predetermined standard, the frequency band including the carrier for which the cumulative value equal to or greater than a threshold value is obtained.

3. The reception device according to claim 2, wherein the CPU detects, from among carriers for which the cumulative value equal to or greater than the threshold value is obtained, the frequency of the carrier having a lowest frequency, as a starting frequency of the frequency band used for the transmission of the signal of the predetermined standard.

4. The reception device according to claim 1, wherein the CPU
divides the predetermined frequency band into a plurality of sections, obtains the correlation values between all the signals transmitted using the same carrier, obtains the cumulative value of the correlation values of each carrier included in a section of the plurality of sections, and
detects the frequency band including the section for which the cumulative value equal to or greater than a threshold value is obtained, as the frequency band used for the transmission of the signal of the predetermined standard.

5. The reception device according to claim 4, wherein the CPU obtains, for each of all of the carriers included in the same section, the correlation value of the signal transmitted at the predetermined time and the signal transmitted at the time immediately preceding the predetermined time, and obtains the cumulative value of the obtained correlation values.

6. The reception device according to claim 1, wherein the OFDM signal is a Digital Video Broadcasting Cable 2 (DVB-C2) OFDM signal, and the known signal is a continual pilot.

7. A method for reception, the method including:
receiving an Orthogonal Frequency Division Multiplex (OFDM) signal of a predetermined frequency band;
obtaining a correlation value between a signal transmitted at a predetermined time and a signal transmitted at a time immediately preceding the predetermined time, for all signals transmitted using a same carrier that is used for transmission of a known signal, from within the predetermined frequency band; and
detecting, based on the obtained correlation values, a frequency band used for the transmission of a signal of a predetermined standard and in which the transmission of the known signal is continuously carried out in the same carrier.

8. A non-transitory computer-readable medium, having stored thereon, a computer program having at least one code section executable by a computer, thereby causing the computer to perform the steps comprising:
receiving an Orthogonal Frequency Division Multiplex (OFDM) signal of a predetermined frequency band;
obtaining a correlation value between a signal transmitted at a predetermined time and a signal transmitted at a time immediately preceding the predetermined time, for all signals transmitted using a same carrier that is used for transmission of a known signal, from within the predetermined frequency band; and detecting, based on the obtained correlation values, a frequency band used for the transmission of a signal of a predetermined standard and in which the transmission of the known signal is continuously carried out in the same carrier.

9. A reception system comprising:
a RF tuner comprising a frequency conversion unit that receives an Orthogonal Frequency Division Multiplex (OFDM) signal of a predetermined frequency band transmitted via a transmission path; and
a central processing unit (CPU) operable to:
  carry out demodulation processing of the received OFDM signal;
  carry out signal processing on demodulated data, and acquire transmission-target data; and
  output the acquired transmission-target data,
wherein the demodulation processing comprises:
obtaining a correlation value between a signal transmitted at a predetermined time and a signal transmitted at a time immediately preceding the predetermined time, for all signals transmitted using a same carrier that is used for transmission of a known signal, from within the predetermined frequency band; and
detecting, based on the obtained correlation values, a frequency band used for the transmission of a signal of a predetermined standard and in which the transmission of the known signal is continuously carried out in the same carrier.

* * * * *